Feb. 21, 1933.    J. GARVEY    1,898,175
APPARATUS FOR DIVIDING DOUGH
Original Filed April 27, 1931    12 Sheets-Sheet 1

Fig.1

Inventor
James Garvey
By Lyon+Lyon
Attorneys

Fig. 2

Feb. 21, 1933.    J. GARVEY    1,898,175
APPARATUS FOR DIVIDING DOUGH
Original Filed April 27, 1931    12 Sheets-Sheet 9

Inventor
James Garvey
By Lyon & Lyon
Attorneys

Feb. 21, 1933.  J. GARVEY  1,898,175
APPARATUS FOR DIVIDING DOUGH
Original Filed April 27, 1931    12 Sheets-Sheet 11

Inventor
James Garvey
By Lyon & Lyon
Attorneys

Patented Feb. 21, 1933

1,898,175

UNITED STATES PATENT OFFICE

JAMES GARVEY, OF LOS ANGELES, CALIFORNIA

APPARATUS FOR DIVIDING DOUGH

Application filed April 27, 1931, Serial No. 533,099. Renewed December 27, 1932.

This invention relates to an apparatus for subdividing dough into pieces of the proper size for baking into bread or rolls of desired weight.

It is the general object of the present invention to provide an apparatus by which dough may be rapidly subdivided into pieces corresponding accurately to a predetermined weight and to provide such an apparatus that the operation of subdividing the dough will not be detrimental to the dough, that is, will not compress the dough or otherwise affect the dough in such manner as to necessitate the dough being re-enlivened or otherwise treated between the subdividing operations and the baking operations.

More particularly the invention has for its object to provide an apparatus in which dough may be subjected to the proper centrifugal force to reduce the dough at the periphery of the centrifuging mass to a predetermined uniform density without placing an excessive pressure on the dough so that when uniform volumes of the dough are taken from the periphery of the centrifuging mass they will all correspond accurately with the desired predetermined weight.

It is a further object of the present invention to provide a centrifugal dough dividing apparatus in which measuring pockets or chambers are provided which can be accurately adjusted in volume so that any desired weight may be accurately secured in operation of the apparatus and so that the same apparatus may be utilized to produce the same weight of dough pieces from different doughs, or may produce the different sizes of dough pieces from the same dough when it is desired to make different sized rolls or bread.

It is a further object of the present invention to provide a centrifugal apparatus for subdividing dough in which the size of the measuring pockets or chambers may be readily altered or adjusted, while the centrifuging machine is in operation and to provide such measuring pockets as may be readily detached from the machine when it is desired.

It is a further object of the present invention to provide measuring pockets for a centrifuge machine with means for latching the same in the various desired positions during the periods of operation of the machine in which the measuring pockets are to remain quiescent so that they may accomplish either a loading or unloading operation.

A further object of the invention is to provide an improved frame construction for a centrifuge machine containing means for maintaining all of the bearings of the machine properly lubricated in operation, and to provide a separate housing or box for the gears controlling motion of the measuring pockets which may in operation hold the gearing immersed in a proper lubricant.

A further object of the present invention is to provide a centrifuging machine for subdividing dough with brake means for stopping the machine at any desired time associated with an automatic device for turning off the motor to the centrifuge machine, and to provide an independently driven rotating conveyor in the centrifuge machine for receiving dough from the measuring pockets, and delivering the same to exit conveyors.

Various further objects and advantages of the present invention will be apparent from the description of a preferred form or example of a centrifuge machine which embodies the present invention. For this purpose I have hereinafter described a preferred form or example of the centrifuge machine by reference to the accompanying drawings, in which.

Referring to the drawings, the apparatus includes a lower frame member 1 which serves to support the reduction gearing leading from the motor 2. The motor 2 (see Figure 1) is preferably an electric motor and may include a gear box 3 and is intended to drive the horizontal shaft 4 (see Figure 2) which is journalled in bearings 5 mounted within a bushing 6 inserted in a horizontal bore in the lower casing 1. The shaft 4 is provided at its inner end with a bevel gear 7 which engages a bevel gear 8 on a stub vertical shaft 9 supported by bearings 10 and 11 in bushings 12 and 13, respectively, mounted by the frame 1. The upper end of the shaft 9 is provided with a gear 14 which engages the gear 15 on the lower end of the main shaft 16 of the centrifuge machine. The main shaft 16 is journalled in bearings 17 mounted in the opposite ends of a nipple 18 which is provided with a flange 19 resting on and bolted to a second frame member 20 which is bolted to the lower frame member 1 as indicated at 21.

Figure 2:
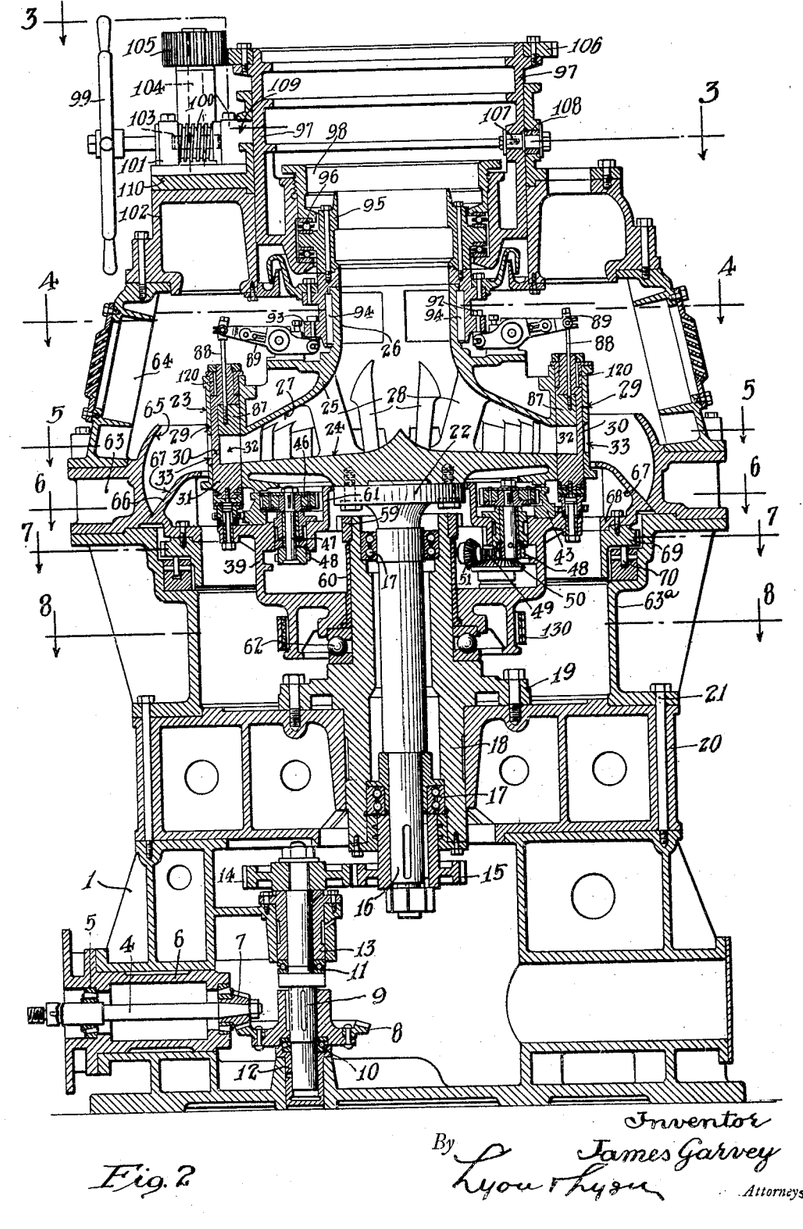
Figure 2 is a somewhat enlarged elevation in vertical section with the motor removed.

The upper end of the main shaft 16 is provided with a flange plate 22 bolted to a centrifuge member 23; said centrifuge member 23 is provided with a lower wall 24 substantially disc-shape and having a central pointed mound with an upper wall 25, the upper portion of which provides an inlet sleeve 26 and the lower portion of which curves downwardly and outwardly, as indicated at 27, so as to form an outwardly contracting centrifuge chamber between the upper and lower walls 25 and 24. Preferably, there are provided pillars 28 between the upper and lower walls of the centrifuge member 23 and the outer ends of the upper and lower walls terminate in vertical tubes 29 which receive measuring members 30.

The measuring members 30 each comprise mainly a vertical cylinder 31 which is provided with an enlarged recess 32 at one side in position when rotated towards the centrifuge member 23 to receive dough from the chamber of said member. Each of the tubes 29 formed on the end of the centrifuge chamber has a port 33 placed in position to discharge the contents of the pocket or recess 32 in the measuring members when the recess is rotated in the direction of the port.

Figures 11, 12, 13:
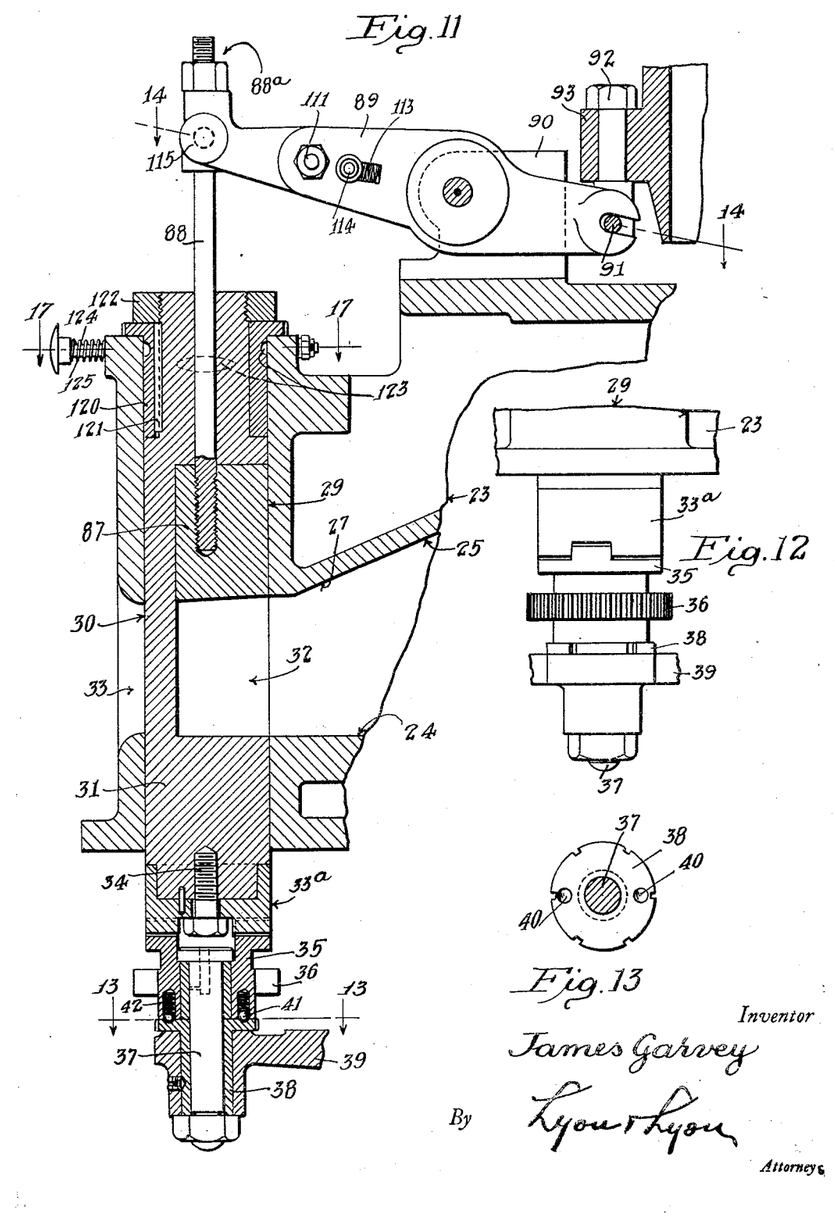
Figure 11 is a fragmentary elevation mainly in vertical section showing the portion of the centrifuge machine carrying the measuring pockets and the rocker arm mechanism for adjusting the effective volume of said measuring pockets or chambers.
Figure 12 is a fragmentary elevation of the lower end of the mechanism shown in Figure 11.
Figure 13 is a section on the line 13—13 of Figure 11.

As best illustrated in Figures 11, 12 and 13, each of the measuring pockets is provided with means for resiliently latching the pockets either in the receiving or discharging positions. The cylinders of the measuring members are also each provided with means for intermittently operating the same during motion of the machine to rotate the measuring members from the receiving position to the discharging position and vice versa. For this purpose the lower ends of cylinders 31 are provided with a clutch member 33$^a$ bolted thereto as indicated at 34, which clutch members are adapted to engage clutch faces on a member 35 which is provided, in addition to its clutch face, with gear teeth 36. The member 35 is mounted by a bolt 37 extending through a bushing 38 which in turn is supported by the outer end of a main revolving gear box member 39.

The means for resiliently latching the measuring members in their different operating positions is provided by recesses 40 in the top face of the bushing 38 which recesses are adapted to be engaged by balls 41 pressed thereagainst by springs 42 held in recesses in the gear member 35. The engagement of the balls 41 with the recesses 40 under the force of springs 42 provides a force sufficient to hold the measuring pockets in position, except as the pockets are rotated by the gear teeth 36.

Figure 1:
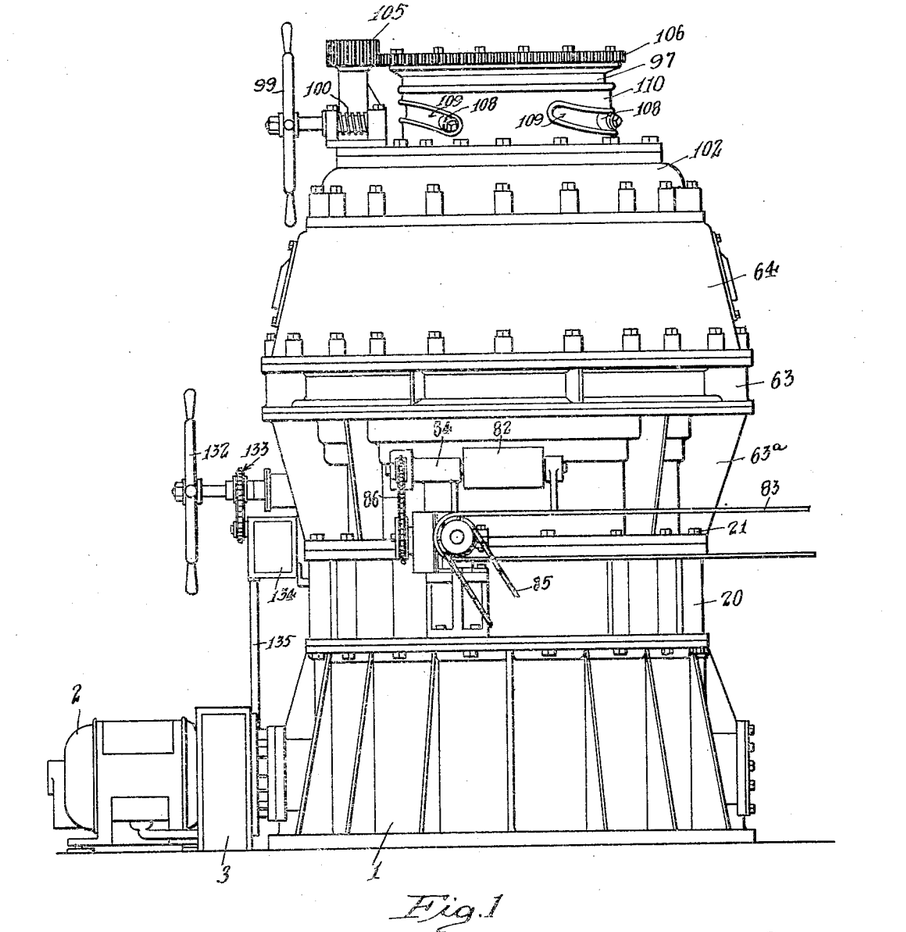
Figure 1 is an elevation of the apparatus.
Figure 6:
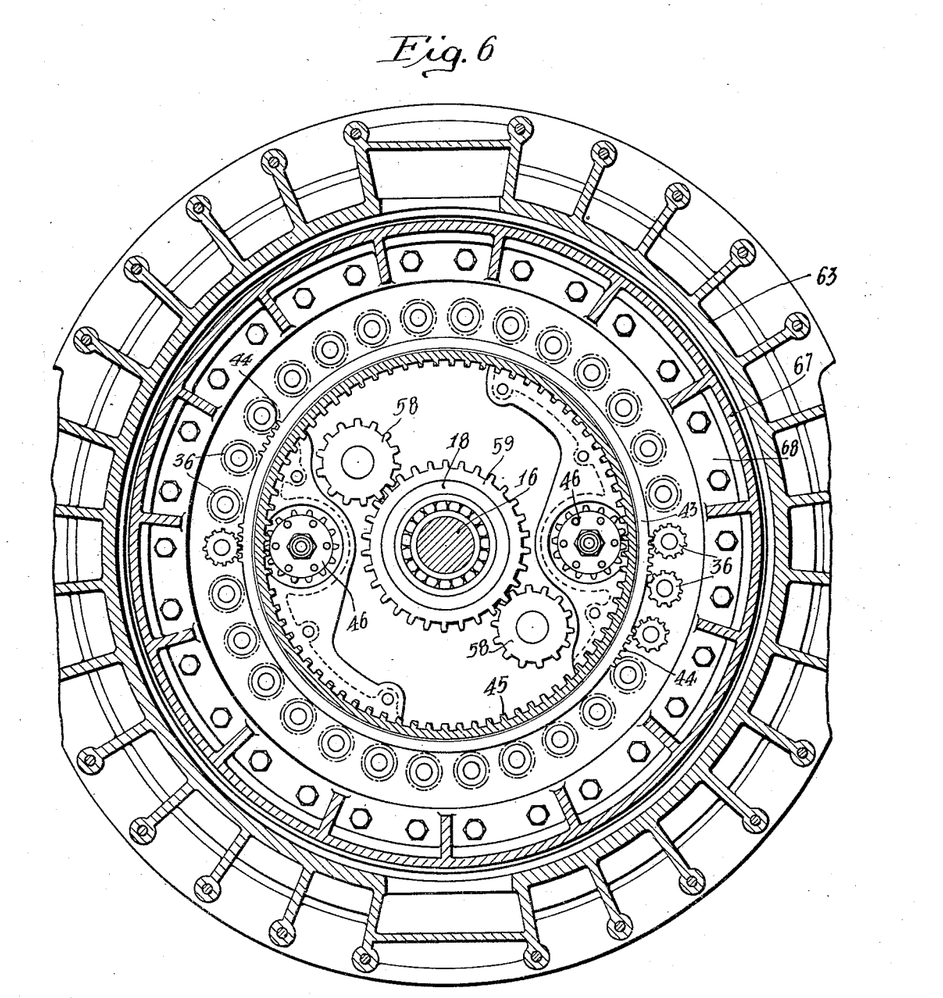
Figure 6 is an enlarged horizontal section on the line 6—6 of Figure 2.

The measuring pockets or members 30 in operation all have their gears 36 positioned to cooperate with a large annular gear member 43 (see Figures 1 and 6). The annular gear 43 has external mutilated teeth 44 which engage with gear teeth 36 of the measuring pockets during a part of the rotation of the gear 43 only, thereby the means of providing an apparatus by which relative rotation between the measuring pockets and the centrifuge chamber 23 takes place only intermittently.

The annular gear member 43 is provided with internal gear teeth 45 which in operation simultaneously engage a pair of diametrically oppositely disposed pinions 46. Each of the pinions is associated with similar gear mechanism which operate together simultaneously, and one only thereof will therefore be described. The pinion 46 is mounted upon a vertical stub shaft 47, the lower end of which (see Figure 7) is provided with a pinion 48 engaging a pinion gear 49 on the upper face of a bevel gear 50. The bevel gear 50 is supported by the main rotatable gear box 39.

The bevel gear 50 in turn engages a bevel gear 51 on a horizontal and eccentric shaft 52 which is supported by brackets 53 and 54 by the gear box 39 and is provided at its inner end with a worm wheel 55. The worm wheel 55 in turn engages a vertical worm 56 journalled in a bracket 57 supported by the gear box 39, which worm 56 at its upper end is provided with a pinion 58 (see Figure 6) which pinion engages a stationary gear 59. The stationary gear 59 is rigidly secured to the upper end of the bushing 18.

With the mechanism thus described the rotation of the centrifuge chamber 23 carries with it the measuring pockets or members 30 and also the gear box 39, including the worms 56 which carry the pinions 58 which are in engagement with the stationary gear 59. Thereby in operation the gears 58 rotate on their axes and the worm 56 transmits through the gear 55 rotation to the shaft 52 and hence by bevel gears 51 and 50 and gears 49 and 48 rotation is imparted to the pinions 46 which engage the internal teeth on the main annular ring gear 43. The mutilated teeth on this ring gear thereby periodically, in operation, engage the gears 36 which are clutched in operation with the measuring members and present the measuring members first to the centrifuge member 23 and then to the discharge ports.

While the conditions of operations will vary somewhat with the dough to be handled, I have found that satisfactory operations are obtained under the following conditions:

The speed at which the centrifuge chamber is to be rotated in operation of course depends upon the size of the centrifuge chamber as it is the centrifugal force at the periphery of the machine which it is desired to control. It is desired to provide a centrifugal force in the machine sufficient to cause the dough which enters the centrifuge chamber when it reaches the periphery of the chamber to be under sufficient force that the larger gas cells of the dough will be ruptured and a considerable portion of the fermenting gases work out of the dough toward the center of the centrifugal bowl. In this manner it is found that the apparent density of the dough reaching the periphery of the machine comes very accurately to a uniform value. It is, however, desired to avoid subjecting the dough to such a large pressure, centrifugal or otherwise, as would entirely crush the dough, rendering necessary the subjecting of the dough to steaming or other re-enlivening operations.

As an example of suitable conditions where the centrifuge chamber is thirty inches (30") in diameter, I have found a speed of approximately 500 R. P. M. is suitable. The measuring pockets with such a machine I have found can be satisfactorily filled with dough if presented to the centrifuge chamber for nine (9) seconds, and that one (1) second is sufficient to rotate the same then to the discharge position, where I have found that one (1) second is sufficient to discharge the dough from the measuring pockets.

It will be noted from Figure 6 that there are four sets of gear teeth 44 on the external side of the ring gear 43. These four sets of teeth are located in pairs at diametrically opposite sides of the annular gear each pair of sets of teeth being spaced apart approximately a distance equal to the distance occupied by each set of teeth. The distances between the two pairs of gear teeth 44 is approximately nine times the length of the individual sets of gear teeth. There are sufficient gear teeth in each set to revolve the gears 36, 180°.

Thus, in operation, considering a single gear 36 to be planetating around the annular gear 43 in a counter-clockwise direction and encountering the first set of mutilated gear teeth 44 at the lower right-hand portion of the gear, as the gears 36 strike this set of gear teeth the pockets having been loaded with dough, the pockets are then rotated 180°, which occupies one second of time. The gear 36 then disengages the first set of mutilated teeth and the pocket remains stationary for a period of time of about one second, during which the dough in the pocket is discharged. Then, the second set of gear teeth 44 engage the gear 36 and again rotate the gear 180°, this occupying a period of time of approximately one second. Then, for a period of approximately nine seconds, the gear 36 remains stationary while it is traveling around to the upper left-hand set of gear teeth 44, during which time the pocket is loaded with dough. It then engages the upper left-hand set of gear teeth. Approximately one second of time is taken rotating the gear 36, 180° to position the pocket in the discharge position. Then the pocket remains stationary for a period of time of about one second when the gear 36 engages the last set of gear teeth 44, shown in Figure 6, for rotating 180° in approximately one second to position the pocket again in the loading position where the pocket is held stationary for approximately nine seconds, while the gear 36 is traveling from the lower set of gear teeth 44, shown at the left-hand part of Figure 6, to the lower set of gear teeth 44, shown in the right-hand part of Figure 6.

It will be noted that the gears 36 are arranged so that the turning of only two gears to the same position can occur at the same instant of time. The gears 36, which are diametrically opposite to each other, load, revolve, unload, revolve and then load again at exactly the same instant of time, but there are thirty gears 36 shown, so that there are fifteen periods of operation of the pockets. The arrangement of gearing which permits these many different pockets to be discharged at different times is important in that over one particle of dough per second is being discharged from the machine, and if all thirty particles of dough were permitted to be discharged at the same instant it would be impossible to remove the same from the machine without the particles being forced together. By having fifteen different periods of operation in which two particles of dough only are thrown onto the revolving conveyor 67 this revolving conveyor is able to deliver a substantially steady stream of divided dough particles, none of which have encountered any other particle and thus become stuck thereto.

In operation the rotatable gear parts are maintained filled with lubricant, and for this purpose is provided with an inner retaining sleeve 60. There is also provided a contorted covering wall 61 within the gear box curved around the upper pinion gears 46 and 58 for holding lubricant around these gears. The lower end of the gear 39 is mounted upon a main thrust bearing 62 which receives a main vertical load both in the gear box and centrifuge chamber 23. This bearing 62 is supported by the nipple 18 in which is journalled the main shaft 16.

The body of the centrifuge chamber revolves within the frame members 63 and 64, of which 63 is the lower member. This member is provided with an annular and concave wall 65 which is adapted to receive pieces of dough subdivided by the machine and cooperates with an annular conveyor 66 in providing a means for delivering particles of dough to the discharge outlets of the machine and also providing a means for in part rounding the particles while they are traveling through the discharge openings. The annular conveyor 66 comprises an inwardly and upwardly inclined wall 67 and a lower inturned flange member 68 which is bolted to a large annular gear 69. The large annular gear 69 in turn is revolvably supported on rollers 70 carried in the frame member 63ª of the machine which frame member surrounds mainly the gear box.

Figure 7:
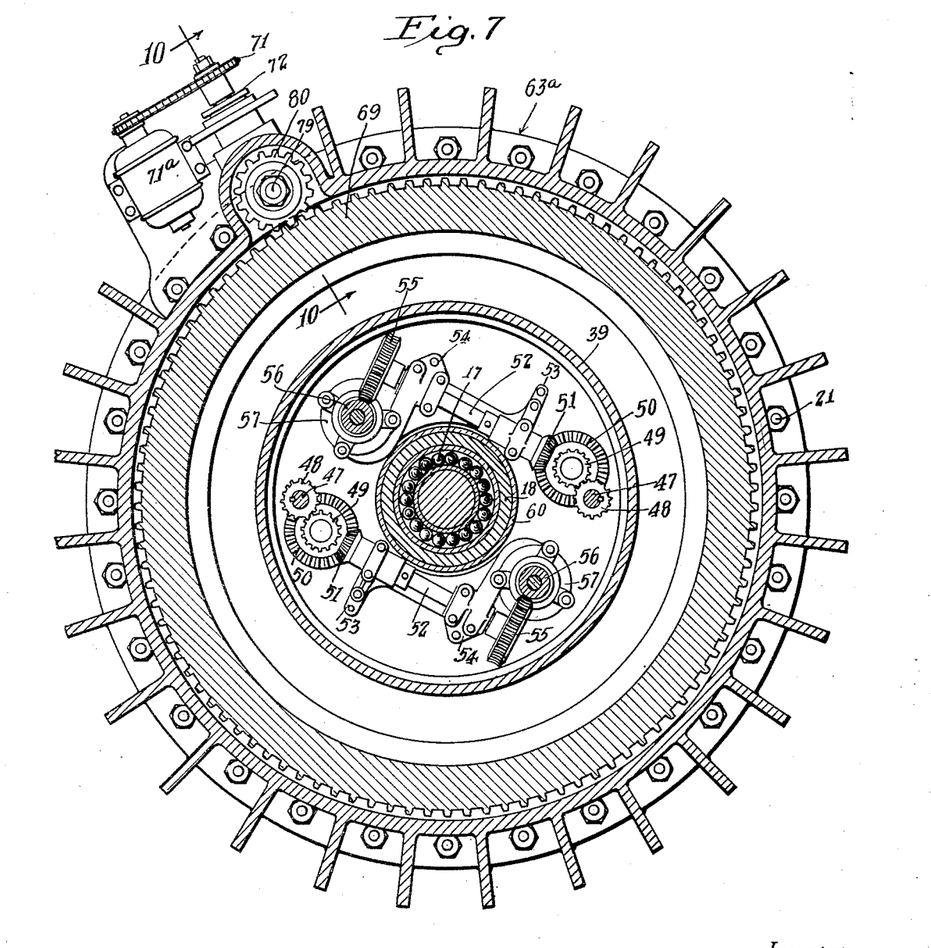
Figure 7 is an enlarged horizontal section on the line 7—7 of Figure 2.
Figure 10:
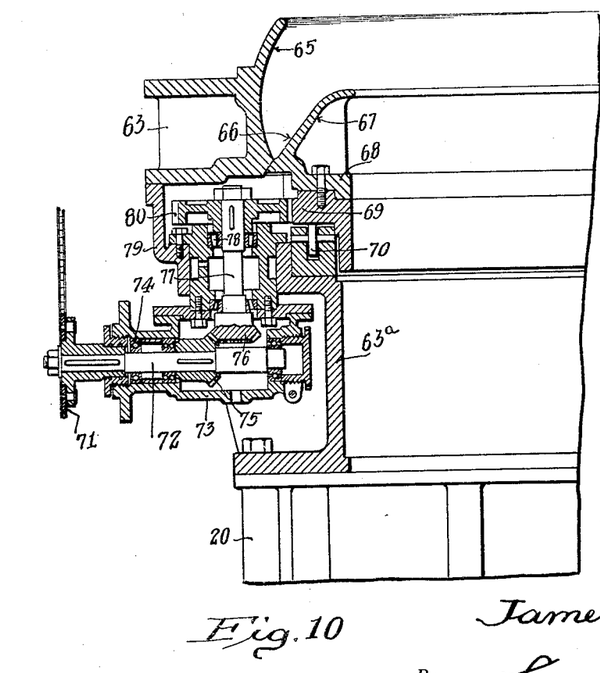
Figure 10 is a fragmentary elevation on the line 10—10 of Figure 7.

Referring now more particularly to Figures 7 and 10, the annular conveyor 66 is preferably driven by a separate drive motor 71ª having a chain drive through a sprocket 71 with a jackshaft 72. The jackshaft 72 is journalled in a bracket 73 secured to the frame member 63ª and provided with bearings 74.

The inner end of the shaft 72 is provided with a bevel gear 75 engaging a bevel gear 76 and a vertical shaft 77 mounted by bearings 78 in a bracket 79 supported by the frame member 63. The upper end of the shaft 77 is provided with a pinion gear 80 which engages the gear teeth on the annular gear 69 which is attached to the rotatable conveyor 66. By this means the annular conveyor 66 may be driven at a suitable slow speed for collecting and passing the particles or pieces of dough subdivided by the machine to the discharge outlets. With a conveyor approximately 42 inches in diameter I have found the suitable speed of said conveyor to be approximately 60 R. P. M.

Figure 9:
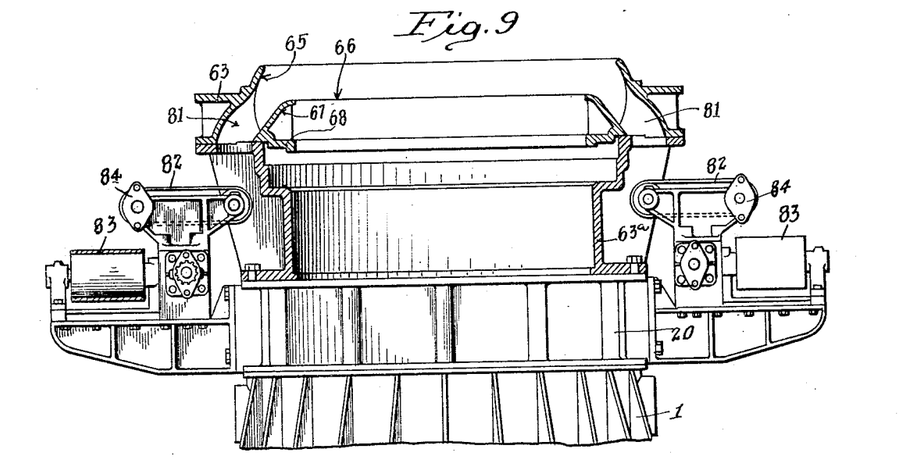
Figure 9 is a fragmentary elevation partially in section on the line 9—9 of Figure 3, the elevation being at right angles to Figure 2.

Now referring more particularly to Figure 9 of the drawings, discharge outlets 81 are provided in the frame member 63 of the apparatus, which discharge outlets drop the particles of dough downwardly onto small conveyors 82. Two discharge outlets 81 are preferably provided and a separate means for conveying the particles of dough from the outlets are provided for each discharge outlet, the same being alike in construction and hence only one thereof will be described.

Figure 3:
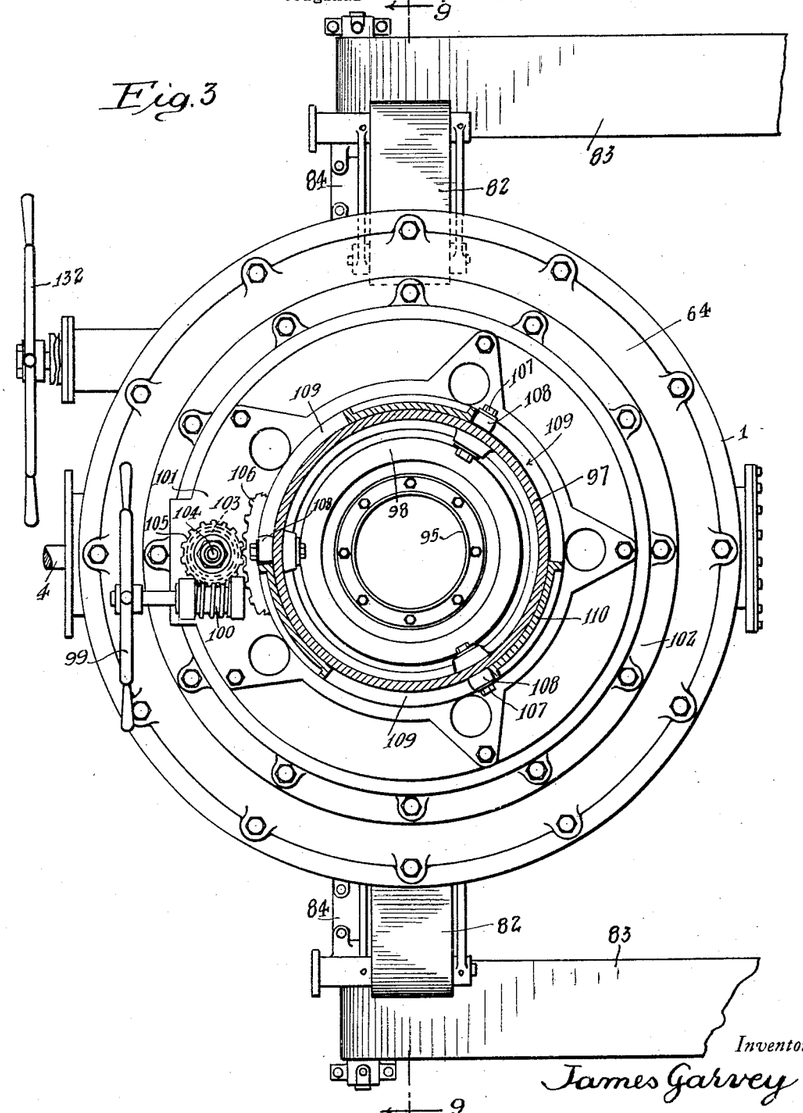
Figure 3 is a horizontal section taken on the line 3—3 of Figure 2.
Figure 4:
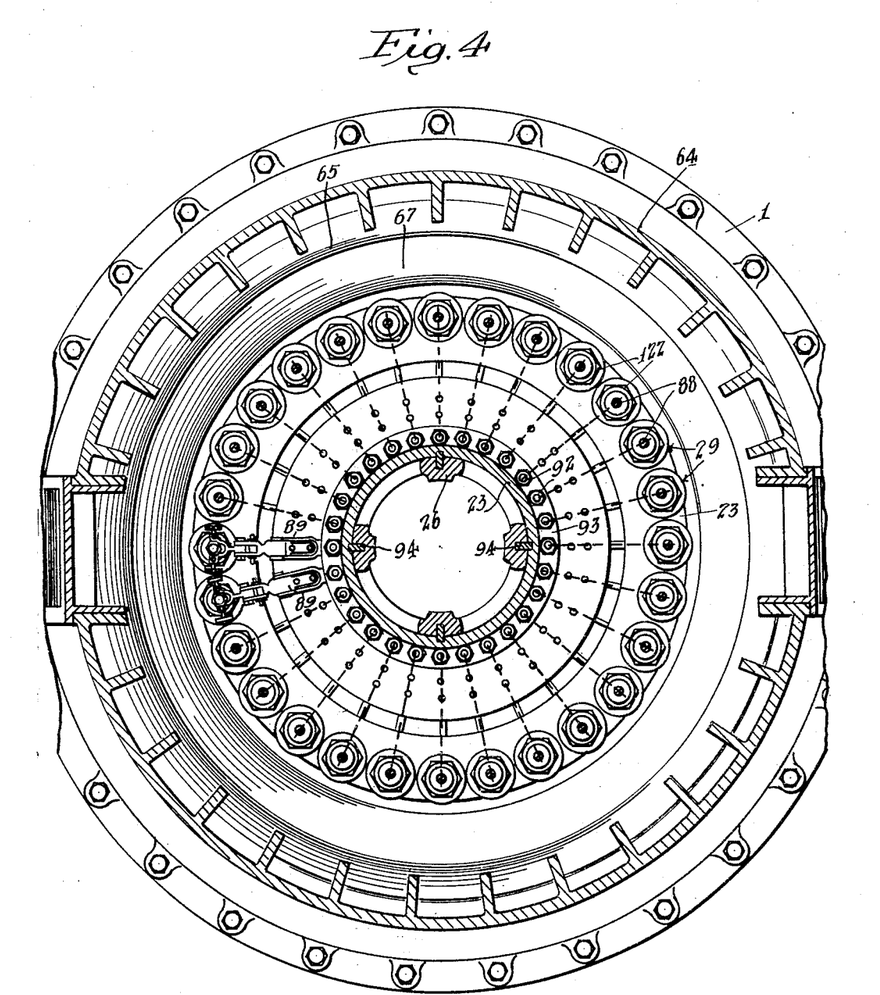
Figure 4 is a somewhat enlarged horizontal section on the line 4—4 of Figure 2.
Figure 5:
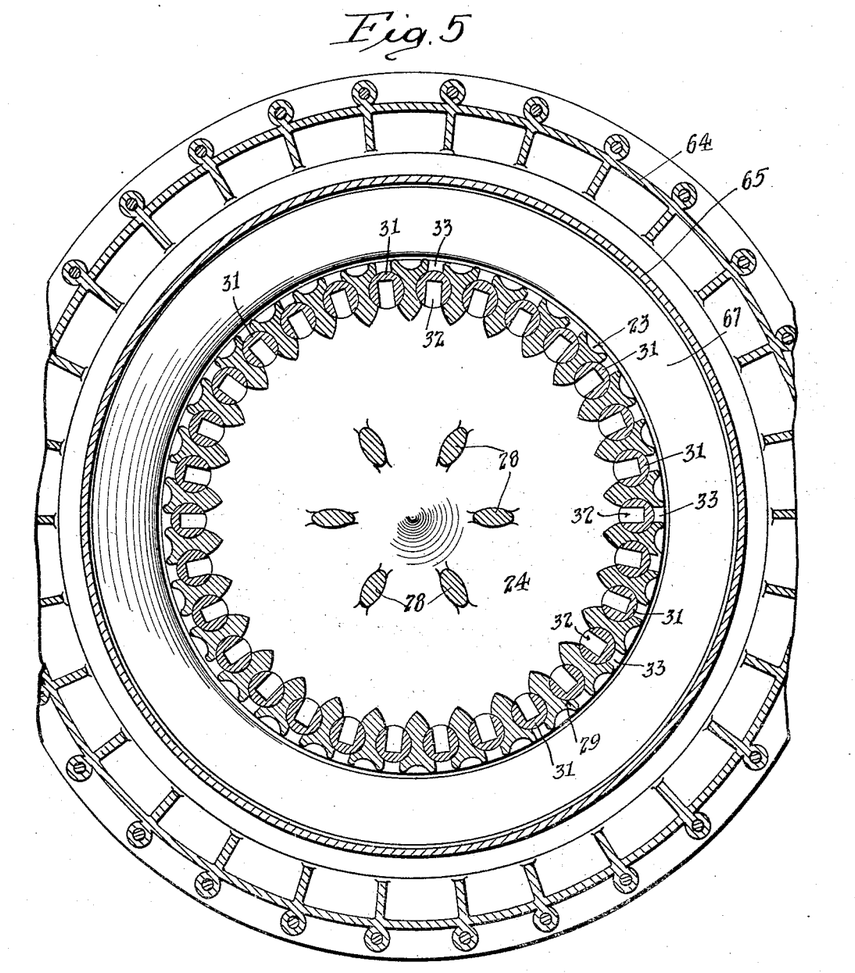
Figure 5 is an enlarged horizontal section on the line 5—5 of Figure 2.

The conveyor 82 (see Figures 1, 3 and 9) delivers the particles of dough to a larger conveyor 83 operating at right angles to conveyor 82. Conveyors 82 and 83 are supported by brackets 84 secured to the frame member 20 and the large conveyor 83 is provided with a sprocket or a drive chain 85 (see Figure 1). The chain drive 85 in turn connects with the chain drive 86 for the upper conveyor 82.

Now referring more particularly to Figure 11, the measuring members are preferably provided with movable blocks 87 in their recesses 32 which may be vertically moved to enlarge or decrease the size of particles of dough which will be received by the measuring member. These measuring blocks provide a means whereby in operation of the machine the particle of dough which is to be received from the machine can be brought accurately to a predetermined weight and also provides a means by which different weights may be obtained from the same machine when it is desired to form different size rolls or loaves of bread. It is important that an apparatus of this character be provided with means whereby these measuring pockets may in operation of the machine be varied in size so the size of particles produced by the machine may be speedily brought to any desired value.

For operating the blocks 87 which control the size of the measuring pockets said blocks are preferably connected with rods 88 which are pivoted at their upper ends to rocker arms 89. The rocker arms 89 are supported by brackets 90 on the centrifuge member 23 (see Figure 2). The opposite ends of the rocker arms 89 are bifurcated and slotted to engage the ends of horizontal pins 91 secured to vertical bolts 92. The bolts 92 are in turn mounted by a ring 93 which has a sliding key 94 engaging the neck of the centrifuge member 23 so that in operation this ring 93 rotates together with the centrifuge chamber but may be vertically translated to rock the arms 89 either to move block 87 upwardly or downwardly to decrease or increase the size of the measuring chambers.

The upper end of the ring 93 is bolted to a second ring member 95 which forms also an inlet to the centrifuge chamber and mounts bearings 96. The bearings 96 are in turn engaged by a ring member 97 having the gland 98 which is adapted in operation to be raised and lowered by the rotation of an operating wheel 99.

The ring 97 is operated by the wheel 99 through the following mechanism:

The wheel 99 rotates a worm 100 mounted by brackets 101 supported on an upper frame member 102 of the machine and the worm 100 operates a worm gear 103 on a vertical shaft 104 which has a long pinion gear 105 at its upper end. This long pinion gear is adapted to be engaged by gear teeth 106 on the ring 97. The rotation of the ring 97 by operation of the wheel 99 is caused to elevate or depress the ring 97 in consequence of the pins 107, of which there are preferably three in number mounted in the ring 97. These pins 107 carry rollers 108 engaging helical cam-ways 109 in the frame member 110.

Now referring more particularly to Figures 11, 14, 15 and 16 the measuring pockets and rocker arm connected therewith preferably include means by which the measuring members 30 may be readily detached from the machine in operation, and for this purpose each of the rocker arms 89 includes a pivot joint 111 which normally is held locked by a dog 112 actuated by a spring 113 in the rocker arms. The dogs 112 are provided with extensions 114 by which they may be readily retracted when desired in order that the outer ends of the rocker arms may be pivoted back to release the rod 88 of the measuring chamber.

Figure 14:
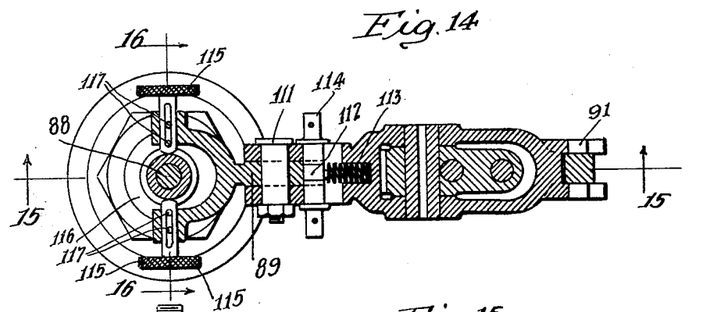
Figure 14 is a substantially horizontal section mainly on the line 14—14 of Figure 11.
Figure 15:
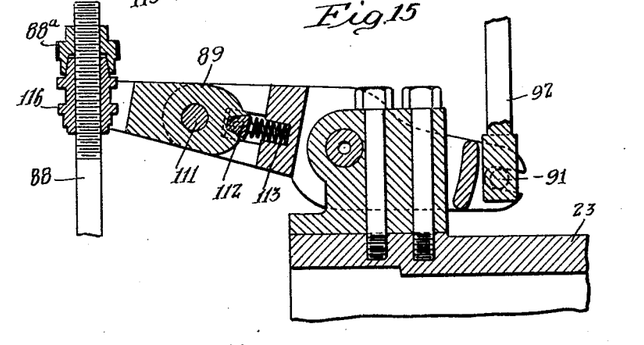
Figure 15 is a fragmentary vertical section mainly on the line 15—15 of Figure 14.
Figure 16:
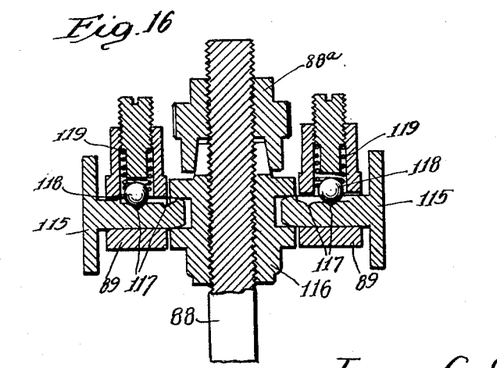
Figure 16 is an enlarged fragmentary vertical section on the line 16—16 of Figure 14.
Figures 17, 18, 19:
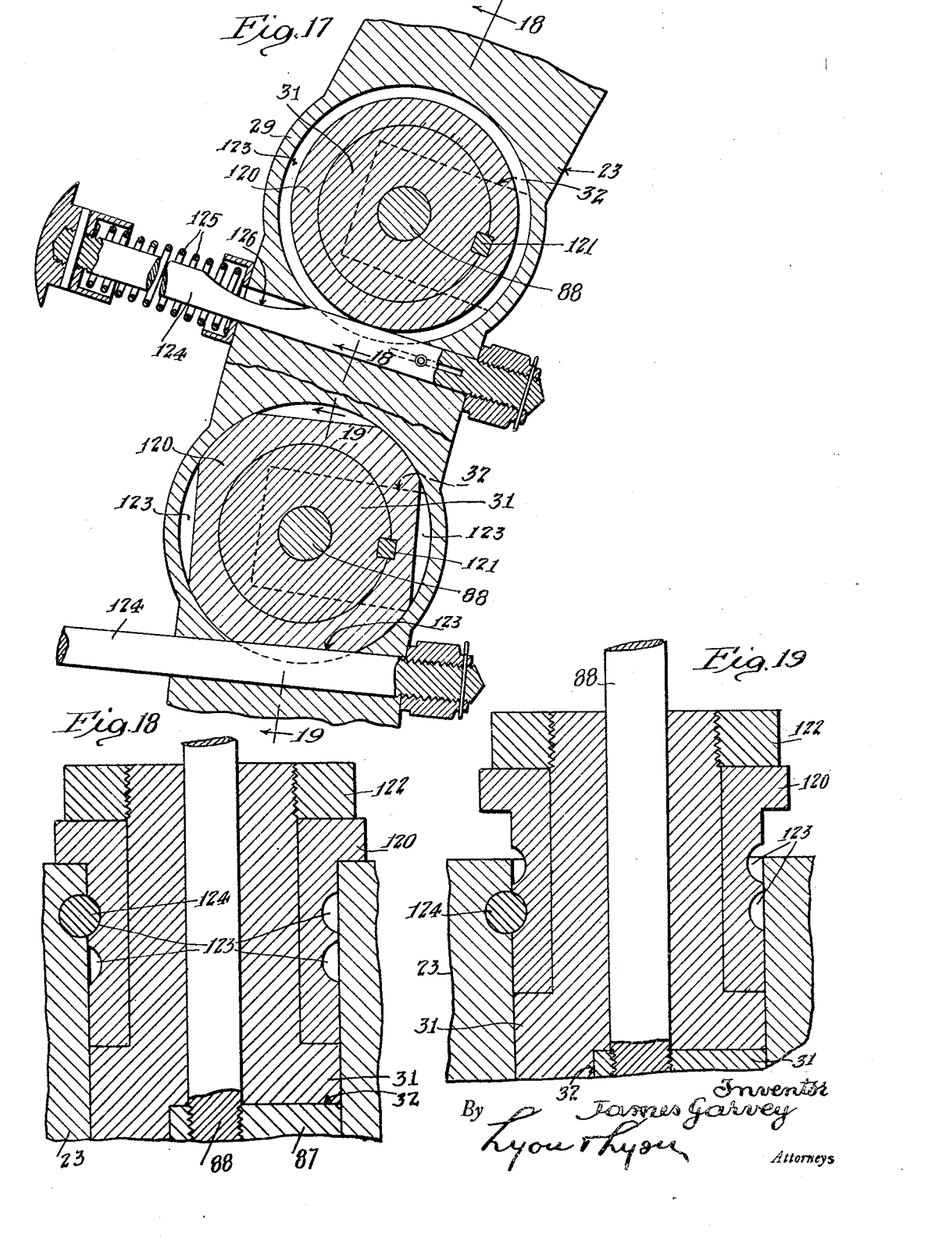
Figure 17 is an enlarged fragmentary horizontal section on the line 17—17 of Figure 11.
Figure 18 is a vertical section on the line 18—18 of Figure 17.
Figure 19 is a vertical section on the line 19—19 of Figure 17.

The rocker arms 89 at their outer ends are preferably bifurcated, as shown in Figure 14, and provided with releasable dogs 115 to engage a groove of a yoke nut 116 on the rod 88. There is also provided a lock nut 88ª on said rod 88. Each of the dogs 115 is provided with two indentations 117 under control of ball latches 118 operated by springs 119 supported by the outer ends of the rocker arms 89. The indentations 117 are placed in position so that the dogs 115 may be latched either in the operating or inoperative position to in one case insure contact with the rocker arms and the rods 89 and in the other case to facilitate the operations of removing the rods 88 from the rocker arms and permitting the removal of the measuring pockets 30.

Now referring particularly to Figures 11, 17, 18 and 19, the apparatus further includes means by which the measuring pockets 30 may be latched within the tubes 29 of the centrifuge member 23 or may be latched partially withdrawn from the tubes 29. For this purpose the upper ends of the cylinders 31 are provided with glands 120 keyed to the cylinders, as indicated at 121, and held thereto by nuts 122.

The glands 120 are each provided with two vertically spaced apart, horizontal grooves 123 which are adapted to be engaged by latch members 124. The latch members 124 comprise bolts passing through the centrifuge member and yieldingly urged to the locking position by springs 125. The latching bolts 124 have curved grooves 126 which when moved to register with the glands 120 will release the glands and permit retraction of the measuring members. It is apparent that the latches 124 may be positioned either in the upper or lower groove, as desired.

Figure 8:
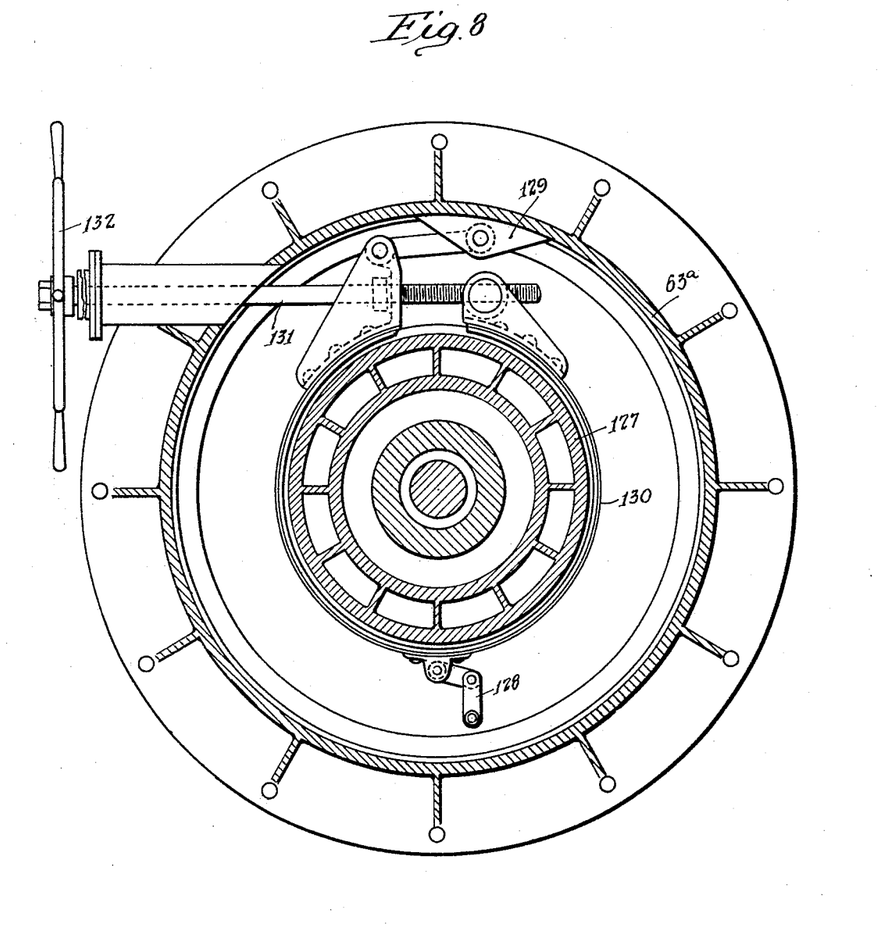
Figure 8 is an enlarged horizontal section on the line 8—8 of Figure 2.

The apparatus further is preferably provided with braking mechanism by means of which, when desired, the operation of the apparatus may be rapidly checked and said mechanism includes means by which the application of the brake will cause a simultaneous cutting off of the power to the motor driving the machine. Said braking mechanism is best illustrated in Figures 2 and 8. The rotatable gear box 39 is provided with a drum surface 127 and the frame members 20 and 63ª support by brackets 128 and 129 a brake band 130 around this brake drum, which brake band is adapted to be tightened by a horizontal rod 131 which extends exteriorly of the machine and is there provided with a wheel 132 by means of which the brake may be applied or released.

Now referring more particularly to Figure 1, the brake rod is provided with a sprocket drive 133 leading to a cut-out box 134 connected by lines in pipe 135 to an electrical motor 2 by means of which the rotation of the brake wheel to apply the brake to the apparatus may be caused to automatically shut off the motor 2.

While the particular form of apparatus herein described is well adapted to carry out the objects of the present invention, it is to be understood that various modifications and changes may be made without departing from the present invention, and the present invention includes all such modifications and changes as come within the scope of the following claims.

I claim:

1. In a dough dividing apparatus, the combination of a centrifuging chamber of a plurality of measuring members rotatable with said centrifuging member and mounted to rotate relative to said centrifuging chamber to first receive dough from the centrifuging chamber and then to discharge dough, gear means for revolving said measuring members relative to said centrifuging chamber in operation, said measuring members comprising relatively movable members adapted to control the size of the measuring pockets of said members, a common means for controlling the different relatively movable members of the different measuring pockets, and means connected with said latter means for actuating the same when the centrifuging chamber is in operation.

2. A dough dividing apparatus which comprises, a centrifuging chamber, a plurality of measuring pockets rotatable with said centrifuging chamber, means for rotating said measuring pockets relative to said centrifuging chamber, said measuring members having relatively moving parts for controlling the size of the pockets of said members, a ring rotatable with said centrifuging chamber and connected with relatively movable parts of said measuring pockets for adjusting the size of all pockets simultaneously, said ring being vertically movable during rotation of the centrifuging chamber, a substantially non-rotatable ring engaging said first mentioned ring and vertically movable in order to control the vertical motion of the first ring, and means for vertically moving said latter ring while the centrifuging chamber is in operation.

3. A dough dividing machine comprising a ring, means for vertically moving the same, a rotatable ring having bearings engaging said first mentioned ring, the vertical position of which is thereby controlled by the first ring, a centrifuging chamber having a plurality of measuring pockets carried thereby, said measuring pockets having means for controlling the pocket sizes thereof and means connecting each of said size controlling means with said latter ring, whereby in operation the vertical position of the latter ring may control the pocket sizes of said measuring members.

4. A dough dividing machine comprising, a centrifuging chamber, a plurality of measuring members having measuring pockets carried by said centrifuging chamber, means for controlling the sizes of said measuring pockets and means for actuating said latter means while the measuring chamber is in operation, including rocker arms connected therewith, a common ring actuating said rocker arms rotatable with said centrifuging chamber and vertically movable relative thereto, a ring having bearings engaging said first mentioned ring, said latter ring being mounted to remain stationary in operation of said centrifuging chamber and movable vertically as desired to control the vertical position of said first mentioned ring.

5. A dough dividing machine comprising a centrifuge chamber, a plurality of measuring members having measuring pockets carried by said centrifuging chamber and rotatable relative thereto, said measuring members being detachable from said centrifuging chamber, gear means for actuating said measuring members, and clutch members for connecting said gear means to said measuring members.

6. A dough dividing machine comprising, a centrifuge chamber having a plurality of measuring members rotatable therewith and rotatable relative thereto in measuring operations, means for latching said measuring members to said centrifuging chamber, means for resiliently latching the measuring members in different operating positions, and an intermittent gear driving means for operating the measuring members.

7. A machine for subdividing dough comprising a frame, a main mounting sleeve having a flange resting on said frame, a main vertical shaft having bearings carried by said sleeve, said shaft carrying the centrifuge chamber, a main gear box member rotatable with said centrifuging chamber and engaging a main vertical bearing on the flange of said sleeve, a stationary gear member and gear means within said rotatable gear box member mainly immersed in lubricant carried thereby, measuring members carried by said centrifuging chamber, and means for connecting the same with said gear means in operation.

8. A dough dividing machine comprising, a centrifuging chamber having a plurality of measuring members carried thereby and rotatable relative thereto, a gear box mounted to rotate with said centrifuging chamber and adapted to carry a reservoir of lubricant, gear means carried within said gear box and connected with said measuring members for operating the same during rotation of said centrifuging chamber.

9. A dough dividing machine comprising, a centrifuging chamber having a plurality of measuring members carried thereby and rotatable relative thereto, a gear box mounted to rotate with said centrifuging chamber and adapted to carry a reservoir of lubricant, gear means carried within said gear box and connected with said measuring members for operating the same during rotation of said centrifuging chamber, said gear means including mutilated gear members imparting an intermittent motion to said measuring members.

10. A machine for subdividing dough comprising a frame, a main mounting sleeve having a flange resting on said frame, a main vertical shaft having bearings carried by said sleeve, said shaft carrying the centrifuge chamber, a main gear box member rotatable with said centrifuging chamber and engaging a main vertical bearing on the flange of said sleeve, a stationary gear member and gear means within said rotatable gear box member mainly immersed in lubricant carried thereby, measuring members carried by said centrifuging chamber, and means for connecting the same with said gear means in operation, said gear means including a mutilated gear and means for latching the measuring members resiliently in the different operating positions.

11. A dough dividing machine comprising a centrifuging chamber, a plurality of measuring members carried by said centrifuging chamber and rotatable on vertical axes relative to said centrifuge member, said measuring members having relatively vertically movable parts forming measuring pockets of variable size, and means for operating said vertically movable parts of said measuring pockets for controlling the pocket size of said members.

12. A machine for subdividing dough comprising a centrifuging chamber, a plurality of measuring members carried by said centrifuging chamber and rotatable relative thereto in vertical axes, said measuring members having vertically movable members for forming measuring pockets of variable size, rocker arm members connected with said vertically movable parts of said measuring members, said rocker arm members including brake joints and spring controlled latches connected with said vertically movable members, and a vertically movable ring connected in common with each of said rocker arms.

13. A machine for subdividing dough comprising a centrifuging chamber, a plurality of measuring pockets carried by said centrifuging chamber, said measuring members having vertically movable parts forming measuring pockets of variable size, rocker arm members connected with said vertically movable parts, including spring controlled latch members, brake joints in said rocker arm members, gear means for actuating said measuring members, and a clutch between said gear members and said measuring members, whereby the measuring members may be readily withdrawn from said measuring chambers.

14. A measuring machine for dough comprising a centrifuging chamber, a stationary gear member, a plurality of pinion gears engaging said stationary gear member and carried in a revolving gear box, worms connected with said pinions, a main annular gear member driven by gearing from said worms, mutilated teeth on said gear member, a plurality of revolvable measuring members carried by said centrifuging chamber, gears connected with said measuring members and adapted to engage said mutilated gears.

15. A machine for subdividing dough in combination with a centrifuging chamber carrying a plurality of measuring members, said measuring members including vertically revolvable cylinders, a clutch means for engaging said cylinders, said clutch means including gears, and latch means for latching the cylinders in different positions.

16. A machine for subdividing dough in combination with a centrifuging chamber carrying a plurality of measuring members, said measuring members including vertically revolvable cylinders, a clutch means for engaging said cylinders, said clutch means including gears, latch means for latching the cylinders in different positions, and means for latching said cylinders for moving vertically relative to said centrifuging chamber.

17. A machine for subdividing dough, comprising a centrifuging chamber having a plurality of lateral outlets, rotatable measuring members operating within said outlets for dividing pieces of dough of predetermined size and discharging the same through said outlets, a stationary gear and reduction gearing carried by said centrifuge chamber and engaging said stationary gear and said measuring member for operating the same upon rotation of the centrifuging chamber, said reduction gearing including a main annular gear member having internal and external teeth, one of said teeth being intermittent.

18. A machine for subdividing dough, comprising a centrifuge chamber, a plurality of measuring members carried by said centrifuging chamber and rotatable relative thereto about vertical axes, said centrifuging chamber having bores open at the upper end through which said measuring member may be retracted for cleaning operations, latch means for holding said measuring members within said bores, and rocker arm members connected with said measuring members and adapted to vary the size of the pockets thereof, said rocker arm members including brake joints and spring actuated latches for disconnecting the same with the measuring members.

Signed at Los Angeles, California, this 9th day of April, 1931.

JAMES GARVEY.